United States Patent [19]

Becker et al.

[11] 4,428,250

[45] Jan. 31, 1984

[54] ELECTRIC DRIVE, PARTICULARLY FOR A WINDOW LIFTING MECHANISM IN A MOTOR VEHICLE

[75] Inventors: Herbert Becker, Coburg; Manfred Sünkel, Sonnefeld; Volker Grams, Coburg; Gerhard Schelhorn, Untersiemau, all of Fed. Rep. of Germany

[73] Assignee: Metallwerk Max Brose GmbH & Co., Coburg, Fed. Rep. of Germany

[21] Appl. No.: 220,009

[22] Filed: Dec. 23, 1980

[30] Foreign Application Priority Data

Dec. 27, 1979 [DE] Fed. Rep. of Germany ....... 2952408

[51] Int. Cl.³ ............................................. B66D 1/12
[52] U.S. Cl. ..................................... 74/425; 74/89.22; 74/431; 49/352; 254/362
[58] Field of Search .................... 49/349, 352; 74/425, 74/606 R, 89.22, 431; 254/362

[56] References Cited

U.S. PATENT DOCUMENTS 3,635,100 1/1972 Littmann ............................ 74/425
4,314,692 2/1982 Beauer et al. ...................... 49/352

Primary Examiner—John E. Murtagh
Assistant Examiner—Richard E. Chilcot, Jr.
Attorney, Agent, or Firm—Toren, McGeady and Stanger

[57] ABSTRACT

A device for driving a rope-like power transmission member for a window lifting mechanism, such as in a motor vehicle, includes a casing with a worm rotatably supported within the casing, a worm gear in the casing and in engagement with the worm and an electric motor driving the worm. A rope drum is positioned within the casing and a coupling part interconnects the drum and the worm gear. The casing has an opening for moving the rope out of the casing. A sealing plate is located between the worm gear and the coupling part and divides the interior of the casing into a first partial space containing the worm and worm gear and a second partial space containing the drum and the coupling part. The sealing plate is arranged in form-locking engagement with the worm gear and it has an annular area facing toward the drum which is in contact with an annular area on the inner surface of the casing.

10 Claims, 6 Drawing Figures

ELECTRIC DRIVE, PARTICULARLY FOR A WINDOW LIFTING MECHANISM IN A MOTOR VEHICLE

The invention relates to an electric drive, especially for a window lifting mechanism in a motor vehicle. The drive comprises a drive casing, an electric motor with a motor shaft which projects into the drive casing, a worm gear which is rotatably supported in the drive casing and meshes with a worm which is attached at the motor shaft, and a driving element for a power transmission member (driving rope, coiled cable, lifting rods or the like) which is arranged inside the casing and connected with the worm gear by means of a coupling.

If an electric drive of this type is operated in a humid environment, then it is difficult or not at all possible to prevent that moisture enters the casing. For the power transmission member which is driven by the driving element at least one opening in the casing must be provided through which moisture may enter. In this way not only the mechanical structure components of the drive, such as the bearing points of the worm gear and motor shaft, are impaired by corrosion, but also the electric motor which is connected to the casing, especially if the motor is flanged to the casing, and if moisture enters the motor fails after a very short time. This problem is especially serious in electric drives for window lifting mechanisms in the doors of motor vehicles because during heavy rain or during the use of a car wash unit large amounts of water flow into the interior of the door.

It is the task of the invention to make available an electric drive of the mentioned type which also reliably operates in a moist environment.

The task is solved in that the worm gear is sealed with respect to the casing in such a way that it separates in a sealing manner a first partial space of the casing, receiving the worm, from a second partial space of the casing which holds the driving element. The moisture which enters the second partial space cannot enter the first partial space. Therefore, in addition to the worm and the motor shaft, also the electric motor which is connected by means of the motor shaft with the first partial space is reliably protected from moisture.

The structural parts which are arranged in the first partial space of the casing, especially the driving element, cannot be damaged by penetrated moisture if these structural parts are made of a water resistant material, especially plastics material.

It is suggested to seal the worm gear preferably in the region of an end face near the periphery with respect to an inner surface of the casing which is perpendicular to the axis of the worm gear. This results in an especially compact arrangement which in addition permits to let the worm drive the worm gear by means of an external toothing.

The worm gear moves with respect to the casing during operation. A sealing arrangement which is also reliable during this movement is accomplished in that the worm gear is sealed with respect to the casing means of a lip seal. Such a lip seal is economical to manufacture which is of special importance for the mass production in the construction of automobiles.

A sealing arrangement which is reliable during movement is obtained when the lip seal is in contact with at least one sealing lip at the worm gear or at the casing. When using a casing seal between two parts of the casing, it is advantageous that the lip seal rests with at least one sealing lip at this casing seal because the elasticity of the casing seal improves the sealing effect.

The lip seal may be constructed as a one-piece or a multipart rubber element of one or more materials, wherein the sealing lips which are constructed at the rubber element may, if appropriate, consist of a softer material than the rest of the rubber element which for instance is inserted in the path of power transmission between the worm gear and the driving element in order to dampen mechanical shocks during operation. In a mechanically especially strong embodiment, the casing is penetrated by a bearing shaft which is preferably supported at both ends at the casing. In order to prevent moisture from entering the first partial space of the casing along the bearing shaft, it is suggested that the worm gear which is rotatably supported on the bearing shaft is sealed with respect to the bearing shaft, preferably by means of an O-ring seal.

It is also suggested that the worm gear is provided with a collar on which the driving element is supported. The mechanical demands on this bearing point are relatively small because the driving element is taken along by the worm gear (by means of a recovering elastic coupling).

The invention is explained below at several exemplified embodiments with the aid of the drawing.

Figure 1:
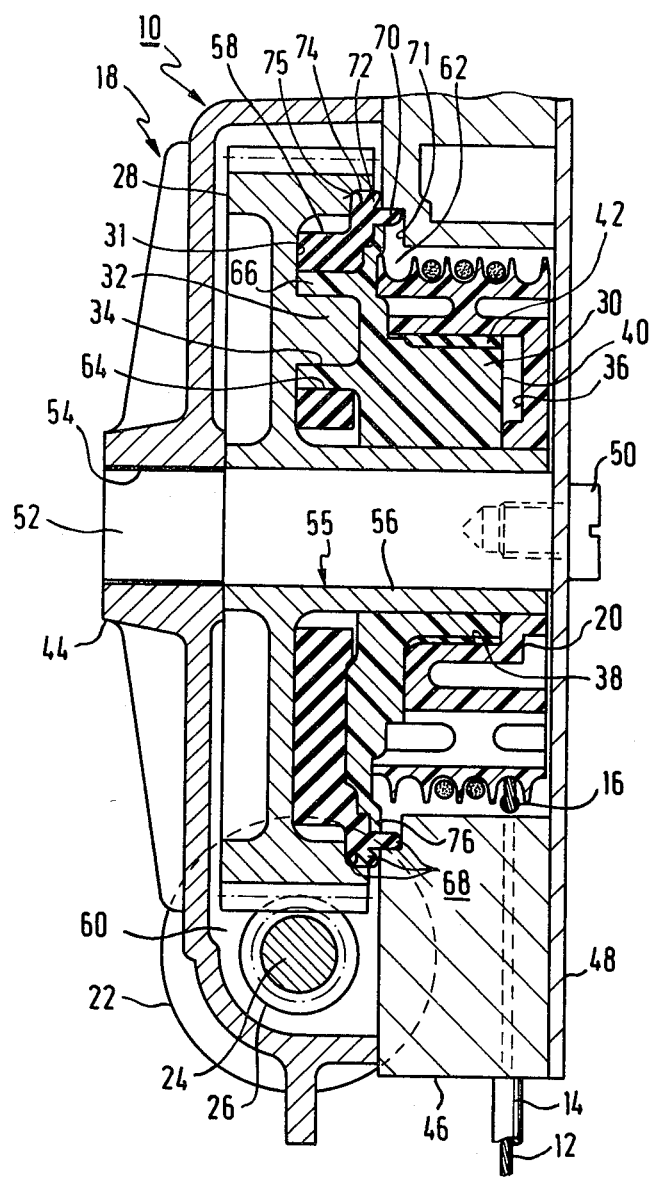
FIG. 1 shows a first embodiment of the drive for a window lifting mechanism according to the invention, shown in partial section.

In FIG. 1 a first embodiment 10 of a drive for a window lifting mechanism is shown which is intended for installation into the door of a motor vehicle. The drive for the window lifting mechanism moves a window, not shown, by means of a driving rope 12 which is guided partially inside a Bowden cable covering 14 and forms an endless loop. In the bottom of FIG. 1, one of the two pieces of the driving rope 12 which leads away from the drive 10 of the window lifting mechanism is indicated. The driving rope 12 enters the interior of the casing through an opening 16 in the casing 18 of the drive 10 of the window lifting mechanism. There the rope is wound on a rope drum 20 and leaves the casing 18 again through an additional opening, not shown.

The rope drum 20 is driven by a schematically indicated electric motor 22 which is flanged to the casing 18. On a motor shaft 24 of the electric motor 22, a worm 26 is rigidly installed for rotation which meshes with a worm gear 28 with external toothing. The worm gear almost fills out the diameter of the casing 18. The axes of the motor shaft 24 and the worm gear 28 extend at a right angle to each other. The rotary motion of the worm gear 28 is transferred by means of a coupling member 30 to the rope drum 20. The worm gear 28 is provided at its end face 31, shown at the right in FIG. 1, with several axially projecting pegs 32 which engage in complementary recesses 34 of the coupling member 30. Consequently the coupling member 30 is taken along by the pegs 32. To transfer the rotary motion further onto the rope drum 20, same is provided with one or more axial recesses 36 (in the upper half of FIG. 1) which are connected with each other by means of annular recesses 38 with a reduced diameter (in the lower half of FIG. 1). The coupling member 30 essentially fills out the axial recesses 36 as well as the annular recess 38 with a section 40 and is, therefore as an axially asymmetrical element, suitable for the transfer of torque onto the rope drum 20.

When the electric motor 22 is switched on and off, a shocklike stress occurs on the entire window lifting mechanism which also occurs when the window is moved towards a stop. In order to avoid this shocklike stress and in order to prevent the transfer of vibrations, a springy damping element is connected in the flow of power in the drive 10 for the window lifting mechanism. This damping element has the form of a rubber ring 42 between the outer periphery of the section 40 and the inner peripheries of the recesses 36 and 38. Instead of the rubber ring 42 or in addition to a rubber ring, rubber cylinders may be provided between fins at the coupling member and inwardly extending projections at the rope drum.

The casing 18 is comprised of a total of three parts with an approximately cup-shaped casing bottom 44, an approximately annular intermediate part 46 and a flat casing cover 48. The parts 44, 46 and 48 of the casing 18 are glued, riveted or screwed to each other. The drive 10 of the window lifting mechanism in FIG. 1 is held together by a screw 50 which penetrates the casing cover 48. The screw is screwed into a bearing shaft 52 which is rigidly connected with the casing bottom 44. The bearing shaft 52 is pressed or glued into an appropriately fitted opening 54 of the casing bottom 44 and is consequently supported at both ends.

The worm gear 28 is rotatably supported on the bearing shaft 52. For this purpose the worm gear 28 is provided with a bearing sleeve 55 which encircles the bearing shaft 52. This bearing sleeve extends over almost the entire distance between the casing bottom 44 and the casing cover 48. The section 56 of the bearing sleeve 55 between the actual worm gear 28 and the casing cover 48 forms a collar on which in turn the coupling member 30 as well as the rope drum 20 are supported.

Through the opening 16 for the rope 12 water may enter into the casing 18, especially when no Bowden cable covering 14 is used. This danger also exists when instead of the driving rope 12 another power transmission member, for instance a coiled cable or a lifting rod, is used. In these cases the rope drum 20 is replaced by a driving pinion which engages into the coiled cable or a toothed sector of the lifting rods. Appropriately large openings in the casing must be provided for the coiled cable or the toothed sector.

The rope drum 20 and the coupling member 30 therefore are made of water resistant material, i.e. plastics material. However, it must definitely be prevented that water enters the interior of the electric motor 22 because this motor fails immediately if, for instance, its commutator brushes are under water. Since the motor shaft 24 usually is not guided into the electric motor 22 in a sealed manner, water may enter the electric motor 22 along the motor shaft 24. In order to prevent this in a simple and economical manner, a rubber element 58 (may also be of elastic plastics material) is provided which separates in a sealing manner the first partial space 60 which receives the motor shaft 24 as well as the worm 26 from a second partial space 62 which holds the coupling member 30 as well as the rope drum 20. This approximately disk-shaped rubber element 58 rests on one side at the worm gear 28 and on the other side at the coupling member 30. Openings 64 of the rubber element 58 are penetrated by the pegs 32 as well as the sections 66 of the coupling member 30 which encircle these pegs. The rubber element 58 forms a moving seal between the intermediate part 46 of the casing 18 and the peripheral area of the worm gear 28. For this purpose three sealing lips 68 are formed on at the circumference of the rubber elements 58. A first, axially extending sealing lip 70 rests against a step 71 of the intermediate part 46, i.e. at a radially extending surface as well as also at an inner peripheral surface of the step 71. A second sealing lip 72 projects obliquely outwardly into the radial groove between the worm gear 28 and the intermediate part 46 and seals this groove. The third sealing lip 74 projects radially outwardly into a groove 75 of the worm gear 28 and comes in contact with a radial surface as well as also an inner peripheral surface of the groove 75.

The three interacting sealing lips 70, 72 and 74 reliably prevent penetration of water from the second partial space 62 into the first partial space 60. In this way penetration of water into the electric motor 22 is prevented as well as also corrosion of the motor shaft 24, the worm gear 26 and the worm gear 28 caused by moisture in the region of the first partial space.

The coupling member 30 supports with a radial web 76 the first sealing lip 70 so that also sealing results between the worm gear 26 and the coupling member 30. Since directly at the coupling member 30 the rope drum 20 adjoins which is also sealed by means of the rubber ring 42 with respect to the coupling member 30, it is reliably accomplished that also the part of the worm gear 28 in the second partial space, i.e. the end face 31 as well as the collar 56, remains free of moisture so that also a less corrosion resistant material, for instance gray iron, may be used for the worm gear 28.

Due to the length of the bearing sleeve 55 it is practically impossible that water reaches between the bearing sleeve 55 and the bearing 52 into the first partial space 60. However, should it nevertheless not be possible to exclude this danger, an O-ring seal, not shown, can be inserted between the bearing shaft 52 and the bearing sleeve 55.

In order to further improve the already mentioned desired damping of shocklike stresses, the rubber element 58 can also be connected in the flow of power. For this purpose, the rubber element is provided for one with a first opening into which the pegs 32 of the worm gear 28 engage in a form-locking manner, and on the other hand a second opening is provided into which the corresponding pegs of the coupling member 30 engage in a form-locking manner. There is no direct rotary connection between the worm gear 28 and the coupling member 30. Therefore, the coupling member 30 is taken along by the worm gear 26 via the rubber element 58 so that shocks and vibrations can be absorbed by the rubber element 58.

Figure 2:
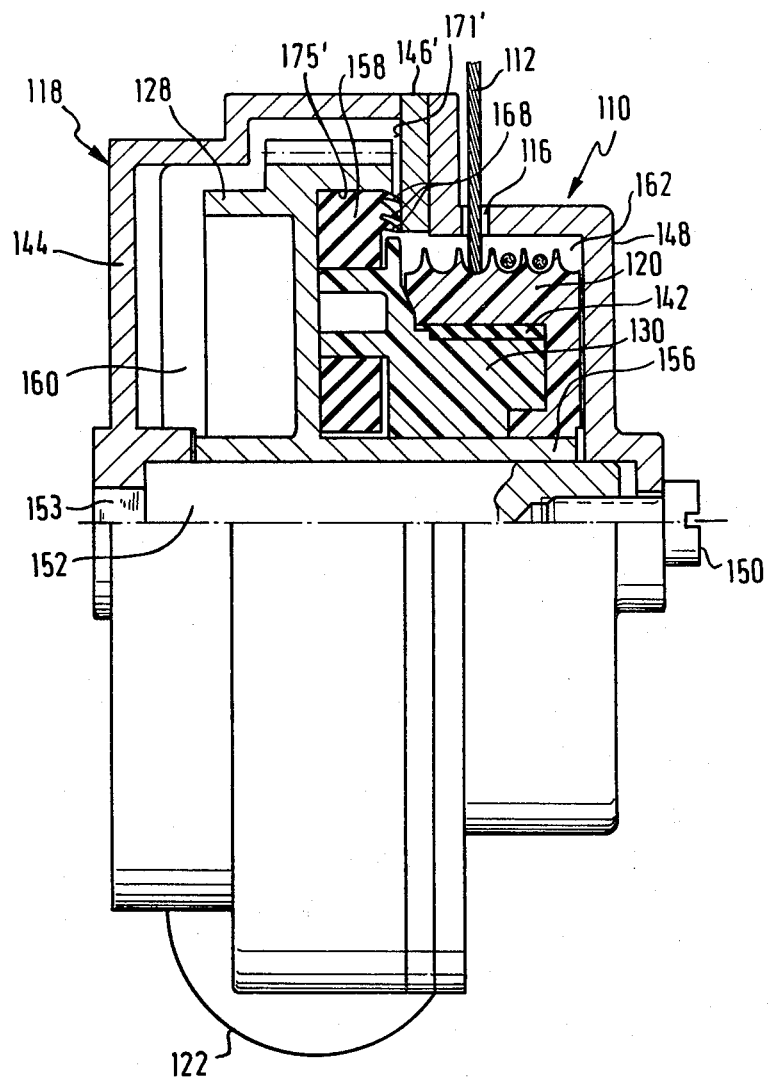
FIG. 2 shows a second embodiment in section.

In FIG. 2 a second embodiment 110 of a window lifting mechanism is shown wherein structural parts which correspond to those of the first embodiment 10 in FIG. 1 are identified with the same reference numbers, always adding 100. The casing 118 is comprised of a casing bottom 144 and the casing cover 148 which is constructed in steps and a radial sealing disk 146' between the casing bottom 144 and the casing cover 148. The bearing shaft 152 is non-rotatably fitted by means of a double edge 153 into a complementary opening of the casing bottom 144.

In the drive 110 for the window lifting mechanism of FIG. 2 the driving rope 112 is freely placed inside the motor vehicle door over appropriate deflection rollers so that the Bowden cable covering is omitted. This increases the danger that water may penetrate through the opening 116 into the second partial space 162. In order to prevent that water also reaches the first partial space 160, the rubber element 158 is provided with three sealing lips 168 which extend approximately axially and are arranged radially outwardly one behind the other. All three sealing lips 168 rest in a sealing manner at a radial end face 171' of the intermediate part 146'. The rubber element 158 rests also in a sealing manner at its periphery at a groove 175' of the worm gear 128 so that as a result the seal between the worm gear 128 and the casing 118 is guaranteed. The described embodiment 110 is of especially simple construction since neither in the intermediate part 146 nor in the worm gear 128 special steps or grooves to receive the sealing lips must be worked in. The rubber element 158 is of relatively simple construction and consequently economical to manufacture.

Figure 3:
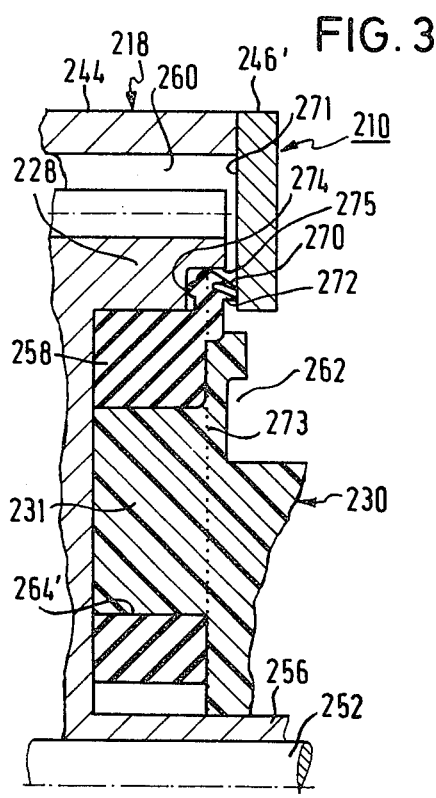
FIG. 3 shows a third embodiment in a detail section in enlarged scale.

FIG. 3 a detail section of a third embodiment 210 of the drive for the window lifting mechanism is shown in enlarged scale. Structural parts in FIG. 3 which correspond to those in FIG. 1 are identified with the same reference numbers, always adding 200.

Figure 6:
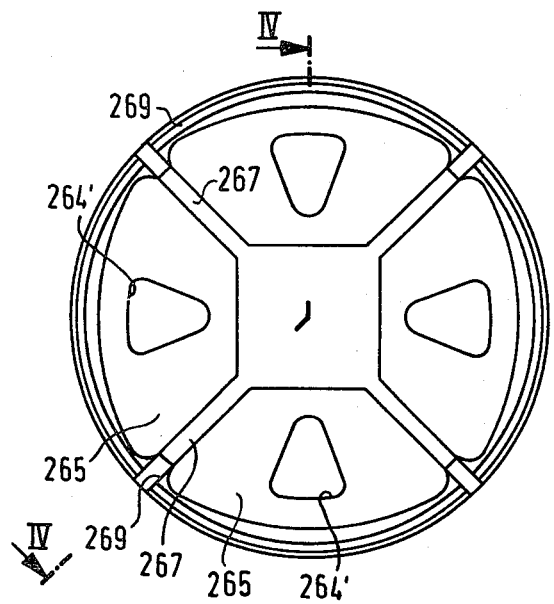
FIG. 6 shows the lip seal according to FIG. 4, viewed from the right.
Figure 4:
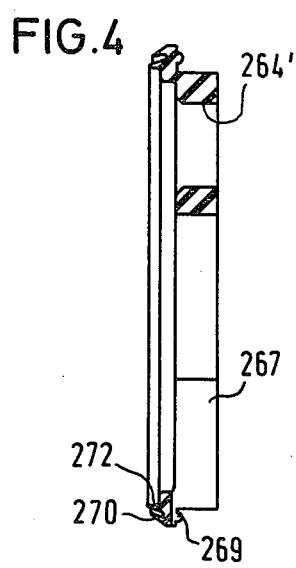
FIG. 4 shows a lip seal in section along line IV—IV in FIGS. 5 and 6 and this lip seal has been placed into the embodiment according to FIG. 3.
Figure 5:
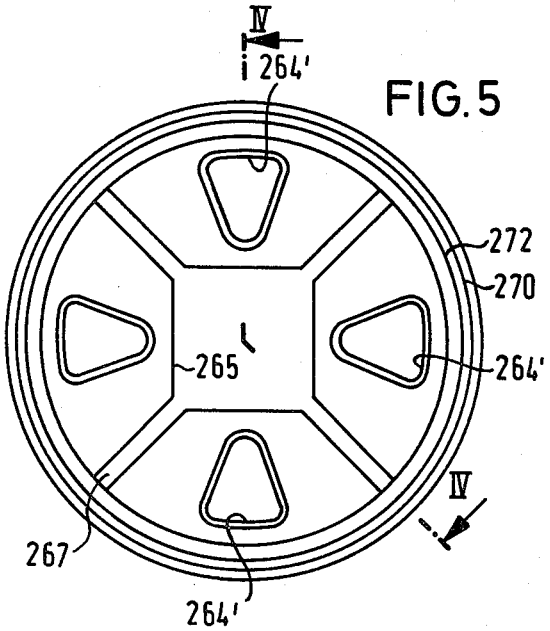
FIG. 5 shows the lip seal according to FIG. 4, viewed from the left.

The only partially shown casing 218 is constructed similar as in FIG. 1 with a casing seal 246' at whose radial surface at the left in FIG. 3 two sealing lips 270 and 272 rest against it. The sealing lips 270 and 272 extend slightly inclined inwardly toward the axis of the bearing shaft 252. While the two lips 270 and 272 are pointed, a third sealing lip 274 is of a toric form. It rests against a radial surface of a groove 275 of the worm gear 228. Contrary to the embodiments 10 and 110, in the embodiment 210 the rubber element 258 is connected in the path of power transmission. In the section of FIG. 3 the force-locking connection between the rubber element 258 and the coupling member 230 is shown. An axial peg 231 of the coupling member 230 engages into an opening 264' of the rubber element 258 (see also FIGS. 4 to 6). The openings 264' are always worked into four approximately sector-shaped portions 265 of the rubber element 258. The portions 265 are separated from each other by radial gaps 267 which start in the center and end in the region of the sealing lips 270 to 274 and always continue in a radial groove 269 of the same width so that only the two sealing lips 270 and 272 remain (see FIGS. 4 and 6) which guarantee the connection of the sector-shaped portions 265.

For the transmission of torque between the worm gear 228 and the rubber element 258, the worm gear 228 is provided with four radial webs 271 of which one is indicated in FIG. 3 with a dotted line. These webs fill out the radial gaps 267 and the grooves 269 and are, therefore, always offset by 45° with respect to the openings 264' or the pegs 231 of the coupling member 230. Therefore the torque is transmitted from the worm gear 228 via the webs 271 to the rubber element 258 and from the latter via the pegs 231 to the coupling member 230. During shocklike stress, the pegs 231 of the coupling member can rotate in the openings 264' with respect to the webs 271 inside the gaps 267 and the grooves 263, wherein the webs 271 ensure that the main deformation takes place inside the sector-shaped portions 265 (shifting of the openings 264'), however the outer shape remains essentially unchanged. The sealing action of the sealing lips 270, 272 and 274 consequently also is maintained during shocklike stress.

We claim:

1. Device for driving a rope-like power transmission member for a window-lifting mechanism, such as in a motor vehicle, comprising a casing, a worm rotatably supported within said casing, an electric motor arranged to drive said worm, a worm gear located within said casing and in engagement with said worm, a rope drum disposed within said casing and having a rope wrapped on said drum, a coupling part positioned within said casing for interconnecting said drum and said worm gear, said casing having an opening for moving said rope out of said casing, wherein the improvement comprises a sealing plate located between said worm gear and said coupling part and dividing the interior of said housing into a first partial space containing said worm and worm gear and a second partial space containing said drum and coupling part, said sealing plate is disposed in form-locking engagement with said worm gear, said sealing plate has an annular area thereon facing toward said drum and said annular area on said sealing plate is in contact with an annular area on the inner surface of said casing, and said sealing plate includes at least one sealing lip disposed in contact with said worm gear.

2. Device, as set forth in claim 1, wherein said at least one sealing lip is formed of a softer material than the material forming said sealing plate.

3. Device for driving a rope-like power transmission member for a window-lifing mechanism, such as in a motor vehicle, comprising a casing, a worm rotatably supported within said casing, an electric motor arranged to drive said worm, a worm gear located within said casing and in engagement with said worm, a rope drum disposed within said casing and having a rope wrapped on said rope drum, a coupling part positioned within said casing for interconnecting said drum and said worm gear, said casing having an opening for moving said rope out of said casing, wherein the improvement comprises a sealing plate located between said worm gear and said coupling part and dividing the interior of said housing into a first partial space containing said worm gear and a second partial space containing said drum and coupling part, said sealing plate is disposed in form-locking engagement with said worm gear, said sealing plate has an annular area thereon facing toward said drum and said annular area on said sealing plate is in contact with an annular area on the inner surface of said casing, and said sealing plate has at least one sealing lip thereon in contact with said annular area on the inner surface of said casing.

4. Device, as set forth in claim 3, wherein said at least one sealing lip is formed of a softer material than the material of said sealing plate.

5. Device, as set forth in claim 1 or 3, wherein said casing comprises a first part and a second part spaced apart in the axial direction of said rope drum, said casing includes a seal located between said first part and said second part and said seal has a side surface area extending radially outwardly relative to the axis of said drum, and said side surface of said seal forms said annular area on the inner surface of said casing.

6. Device, as set forth in claim 1 or 3, wherein said worm wheel comprises a tubular collar with the axis thereof disposed in parallel relation with the axis of said drum, and said coupling part and said drum are supported on said collar.

7. Device, as set forth in claim 1 or 3, wherein said drum and said coupling part are formed of the water-resistant material.

8. Device, as set forth in claim 7, wherein said drum and said coupling part are formed of a plastics material.

9. Device, as set forth in claim 1 or 3, wherein a bearing shaft is located within and is supported at both ends of said casing, the axis of said bearing shaft disposed in parallel relation with the axis of said drum, said worm wheel is rotatably supported on said bearing shaft, and means for providing a seal between said worm wheel and said bearing shaft.

10. Device, as set forth in claim 9, wherein said sealing means comprises an O-ring seal.

* * * * *